United States Patent [19]
Larson et al.

[11] Patent Number: 5,907,324
[45] Date of Patent: *May 25, 1999

[54] METHOD FOR SAVING AND ACCESSING DESKTOP CONFERENCE CHARACTERISTICS WITH A PERSISTENT CONFERENCE OBJECT

[75] Inventors: James A. Larson, Beaverton; Jim Elliott, Portland; Dale Boss; Sridhar Iyengar, both of Beaverton, all of Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/968,857

[22] Filed: Nov. 5, 1997

Related U.S. Application Data

[63] Continuation of application No. 08/485,642, Jun. 7, 1995, abandoned.

[51] Int. Cl.⁶ .............................. G06F 3/00; G06F 15/16
[52] U.S. Cl. ........................ 345/330; 345/331; 345/971; 395/200.35; 395/200.34; 395/200.58
[58] Field of Search .................................. 345/330, 329, 345/331, 971, 332, 333, 335, 339; 395/200.34, 200.35, 200.31, 200.58, 200.57

[56] References Cited

U.S. PATENT DOCUMENTS

| | | | |
|---|---|---|---|
| 5,247,615 | 9/1993 | Mori et al. | 395/200.35 |
| 5,347,306 | 9/1994 | Nitta | 345/330 X |
| 5,363,507 | 11/1994 | Nakayama et al. | 345/331 |
| 5,491,743 | 2/1996 | Shiio et al. | 345/332 X |
| 5,583,993 | 12/1996 | Foster et al. | 395/200.35 |
| 5,594,859 | 1/1997 | Palmer et al. | 345/330 |
| 5,611,050 | 3/1997 | Theimer et al. | 395/200.32 |
| 5,644,715 | 7/1997 | Baugher | 395/200.58 |
| 5,664,126 | 9/1997 | Hirakawa et al. | 345/329 |
| 5,745,711 | 4/1998 | Kitahara et al. | 345/330 |
| 5,799,191 | 8/1998 | Moriyasu et al. | 345/331 X |

*Primary Examiner*—Raymond J. Bayerl
*Attorney, Agent, or Firm*—Blakely, Sokoloff, Taylor & Zafman LLP

[57] ABSTRACT

A method of saving, retrieving and dynamically establishing a plurality of conference parameters. A desktop conferencing system includes a plurality of nodes connected in a network. A user of the desktop conferencing system is able to manipulate a persistent conference object where a persistent conference object is an object including a plurality of items of information pertaining to a desktop conference. Each of the conference parameters are monitored, updated and saved. It is then possible to retrieve and dynamically establish conference parameters of a conference stored in a persistent conference object by: (1) prompting a user for an identifier identifying a particular persistent conference object on disk; (2) opening the specified persistent conference object by copying it from disk to memory; (3) reading the conference parameters stored in the persistent conference object in memory; and (4) implementing the conference parameters to establish the desired conference environment.

20 Claims, 12 Drawing Sheets

METHOD FOR SAVING AND ACCESSING DESKTOP CONFERENCE CHARACTERISTICS WITH A PERSISTENT CONFERENCE OBJECT

This is a continuation of application Ser. No. 08/485,642 filed Jun. 7, 1995, now abandoned.

BACKGROUND OF THE INVENTION

There are numerous software applications and hardware products in the market that store and track information concerning a meeting or conversation.

For example, one such software application is an electronic calendar that may be used to store the time, length, topic, and the participants of a conference. This conference may be a telephone conversation, a live meeting, or an electronic conference via a person's computer.

Another such application is a personal information manager (PIM) that is used widely to record notes and minutes from telephone discussions and/or conversations. PIms also can be used to record the participant's telephone number. A PIM user can quickly obtain information about another party, their telephone number, and a summary of a previous conversation. If a PIM is Telephone Application Programming Interface (TAPI) compatible, then the PIM can place a telephone call on behalf of the user.

There also exist hardware products on the market that will connect up multiple participants for a conference. For example, a telephone bridge can host a multi-party telephone conversation. The various participants call into the telephone bridge and the bridge acts as a host to connect each of the participants into a telephone conference.

Another example is a Multi-Point Control Unit (MCU), which is installed into a computer system. The MCU schedules and initiates telephone conferences between multiple parties. To reserve a "MCU slot", users specify the proposed start time, length and the participants of a desktop conference. The MCU captures this information and stores it as a reservation record. This reservation record is accessible to the computer system and may be used to establish a desktop conference.

Although there have been major strides in this area of software applications to track information about conferences, there are major disadvantages of all the above-mentioned products and/or applications.

First, none of the above discussed systems is adapted to store all the essential characteristics of a desktop conference. Second, none of the above systems allows the user to store all important characteristics of a conference prior to a conference or at any point during a live conference. Third, none of the above systems enables a user to access and retrieve those conference characteristics and automatically resume a prior conference.

SUMMARY OF THE INVENTION

The technique described below uses a method which allows a participant in a desktop conference to store conference characteristics and parameters into a persistent conference object, as defined below. These characteristics include conference session information, participant information, application information, document information, and conference policies.

Conference session information includes the name of a conference, a description of the objective of the conference, a reservation number, a scheduled start time, a planned duration of the conference, a maximum number of participants, and other relevant information identifying and/or describing the conference.

Participant information includes a name, an address, a call-out number, a call-in number, a password, authentication procedure, an initial status, a most recent status, and preferred color priorities for each of the participants. A call-in number is a bridge number that a participant dials to join a conference session. A call-out number is a participant's telephone number that a MCU dials to connect a participant to a conference. Status indicates whether a participant is active or inactive in the conference. Preferred color priorities is a prioritized list of colors which will identify a participant when the participant annotates or uses a telepointer.

Application information includes an application's name, where the application is stored within a computer system (e.g., on the hard drive), a most recent status, and an initial layout specification of the application.

Document information includes a name and a file location of the document, host location, and a most recent status. A host computer is simply the computer that contains/stores the document. A host location is the location of the host computer within a network of computers. The host location is used to locate the computer that contains a desired file. A most recent status is an indication of whether the document was in use at the time the status was recorded.

Session policies are those policies that govern a conference and specify how communication and business matters will be accomplished during a conference session. For example, baton passing is a policy that refers primarily to protocols for specifying which participant is currently hosting and/or speaking to the others in a conference. Joining policies establish the procedures that users must follow to join a particular session. Security policies may limit the number of participants and require an invitation and/or a password before a participant may join a particular conference. Other general policies include rules about how business is to be transacted during that particular conference.

The technique described below also uses a method that allows a participant, while in a live desktop conference, to at any time, save the characteristics of that conference session. In other words, a participant, may at any time during a conference, execute a user-initiated command to store the various characteristics of the conference to a persistent conference file. The user may also edit and create a persistent conference file before a conference begins. This persistent conference file includes those characteristics described above (i.e., participant information, applicant information, document information, and session policies).

The invention also allows a user to retrieve conference parameters from the persistent conference file and automatically resume any prior conference by simply executing a user-initiated resume command and by providing the persistent conference file, which the user wishes to resume.

With this present invention, a user is provided with a data structure, a persistent conference file, that records many more conference characteristics parameters than prior art devices and applications. Thus, a participant can record many more characteristics of a conference (i.e., application and document use) than the prior art allowed.

Furthermore, a participant can now store characteristics and parameters of a conference session and automatically resume the conference at a later time without having to manually establish and input for the second time the various characteristics of the conference.

The present invention also provides not only for the storage of these conference characteristics, but also for the automatic implementation of all the conference characteristics by one user-initiated command.

This invention saves the participants tremendous amounts of time that would, without this invention, be consumed in establishing and calling each of the participants, opening all the applications that were open at that point in the conference, and finding and opening all documents that were opened at that point in the conference and also recalling and reestablishing all the policies of that particular conference.

DETAILED DESCRIPTION OF THE INVENTION

NOTATION AND NOMENCLATURE

Figure 1:
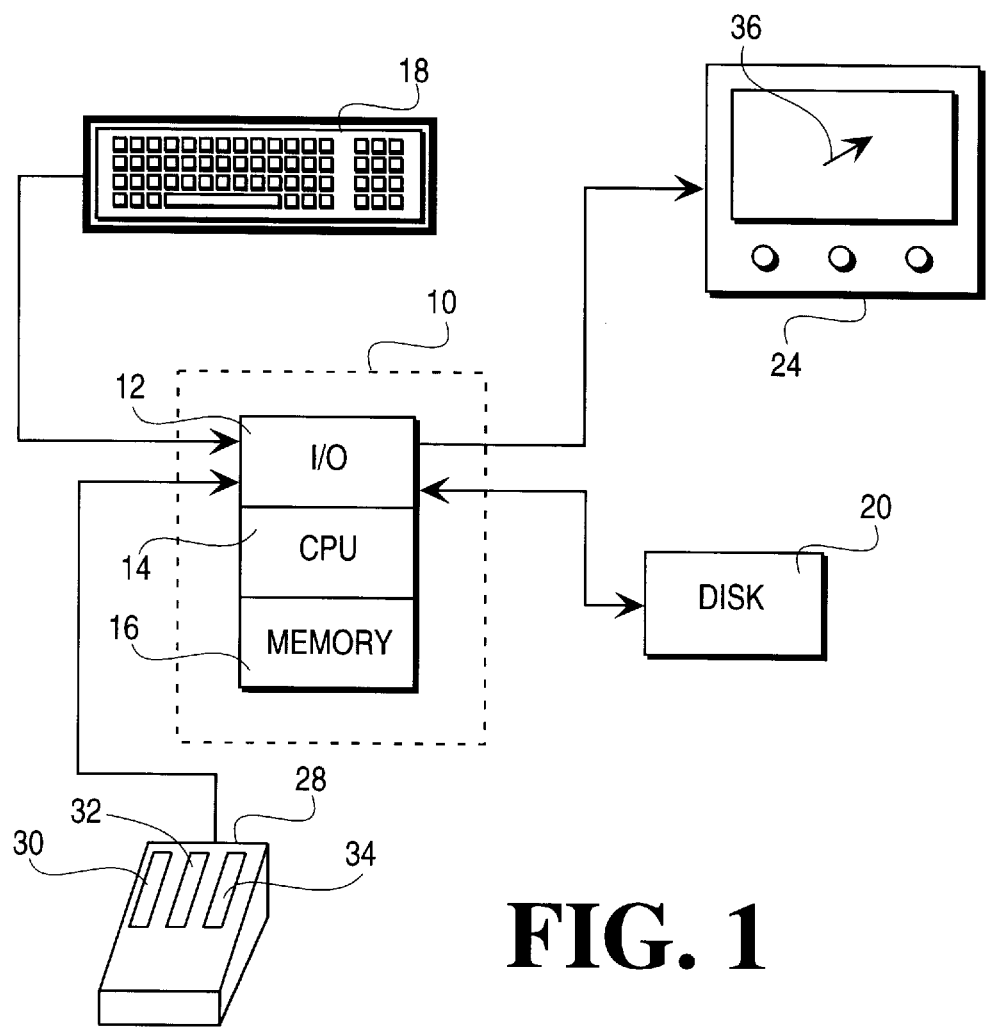
FIG. 1 illustrates a computer incorporating the teachings of the present invention.

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as windows, icons, desktops, bits, values, elements, symbols, characters, terms, numbers, or the like. It should be borne in mind, however, that all of these and similar terms are to be associated with the appropriate physical quantities and are merely convenient labels applied to these quantities.

Furthermore, the manipulations performed are often referred to in terms, such as adding or comparing, creating, allocating and/or associating, which are commonly associated with mental operations performed by a human operator. No such capability of a human operator is necessary, or desirable in most cases, in any of the operations described herein, which form part of the present invention; the operations are machine operations, although when dealing with a graphic user interface, by its nature, the man/machine interface utilizes some form of human input. Useful machines for performing the operations of the present invention include general purpose digital computers or other similar devices, such as, for example, those manufactured by the assignee, Intel Corporation. In all cases, there should be borne in mind the distinction between the method operations and operating a computer and the method of computation itself. The present invention relates to apparatus and methods for operating a computer and processing electrical or other physical signals to generate other desired results.

The present invention also relates to apparatus for performing these operations. This apparatus may be specially constructed for the required purpose or it may comprise a general purpose computer as selectively activated or reconfigured by a computer program stored in the computer. The images, algorithms, and data structures presented herein are not inherently related to any particular computer or other apparatus. In particular, various general purpose machines may be used with programs written in accordance with the teachings herein, or it may prove more convenient to construct more specialized apparatus to perform the required method steps. In addition, no particular programming language has been indicated for carrying out the various procedures described herein. This is due in part to the fact that not all languages that might be mentioned are universally available. Each user of a particular computer will be aware of the language which is most suitable for his immediate purposes. Accordingly, no detailed program listings have been provided. It is considered that the operations and other procedures described herein and illustrated in the accompanying drawings are sufficiently disclosed to permit one of ordinary skill to practice the instant invention or so much of it as is of use to him/her.

The present invention discloses a method for storing, retrieving and dynamically establishing conference parameters in an electronic conferencing system. In particular, the present invention is a unique method that allows a user to selectively store conference parameters into a persistent conference file/object and to dynamically establish a conference environment having the stored values by recalling a persistent conference object having the desired conference parameters/traits. In the following description, numerous specific details are set forth such as computer display system elements, display window formats, sample data, etc. in order to provide a more thorough understanding of the present invention. However, it will be apparent to one skilled in the art that the present may be practiced without these specific details. In other instances, well known circuits and structures are not described in detail so as not to obscure the present invention unnecessarily.

FIG. 1 illustrates a computer based system for implementing the teachings of the present invention. Shown is a Computer 10 which comprises three major components. The first of these is an Input/Output (I/O) Circuit 12 which is used to communicate information in appropriately structured form to and from other portions of the Computer 10. In addition, Computer 10 includes a Central Processing Unit (CPU) 14 coupled to the I/O Circuit 12 and a Memory 16.

These elements are those typically found in most general purpose computers and, in fact, Computer 10 is intended to be a representative of a broad category of data processing devices. Also shown in FIG. 1 is a Keyboard 18 to input data and commands into Computer 10, as is well known. A Magnetic Disk 20 is shown coupled to I/O Circuit 12 to provide additional storage capability for the Computer 10. It will be appreciated that additional devices may be coupled to Computer 10 for storing data such as magnetic tape drives, bubble memory devices, as well as networks which are in turn coupled to other data processing systems. As is well-known, Disk 20 may store other computer programs, characters, routines, etc., which may be accessed and executed by CPU 14. A raster display Monitor 24 is shown coupled to the I/O Circuit 12 and is used to display images generated by CPU 14 in accordance with the present invention. Any well known variety of cathode ray tube (CRT) display may be utilized as Display 24. A Cursor Control Device 28 is also shown coupled to Computer 10 through I/O Circuit 12. Cursor Control Device 28 includes Switches 30, 32, and 34 for signaling CPU 14 in accordance with the teachings of the present invention. Cursor Control Device 28 (commonly known as a "mouse") permits a user to select various command modes, modify graphic data, and input other data utilizing Switches 30, 32 and 34. More particularly, Cursor Control Device 28 permits a user to selectively position a Cursor 36 at any desired location on Display 24 by movement of the Cursor Control Device 28 over a surface. In the presently preferred embodiment, Cursor Control Device 28 utilizes well-known methods for signaling CPU 14 of positional changes of Cursor 36 by movement of cursor control device 28 over a surface. However, it will be appreciated that a variety of well known cursor control devices may be utilized by the present invention, including other cursor control devices such as mechanical mice, track balls, joy sticks, etc.

Figure 2:
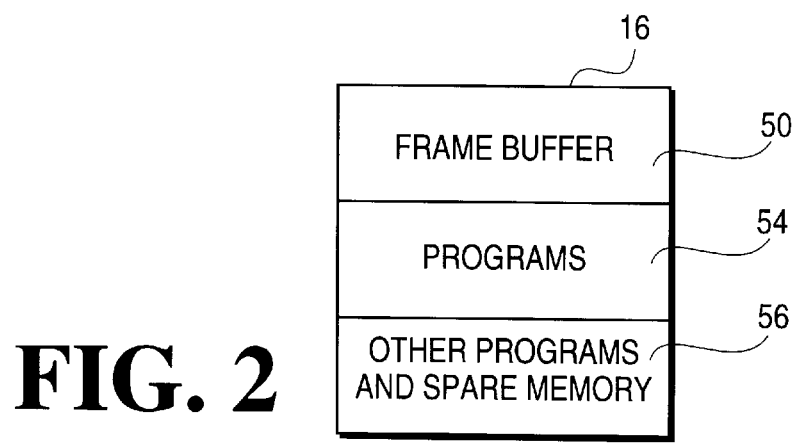
FIG. 2 shows one arrangement of program storage for the system of FIG. 1.

FIG. 2 shows one arrangement of the Memory 16 illustrated in FIG. 1. In particular there is shown a Frame Buffer 50, which comprises a bit map of the image on Display 24. The Frame Buffer 50 represents the video memory for the Display 24, wherein each storage location in the Frame Buffer 50 corresponds to a pixel on the Display 24. Thus, the frame buffer comprises a two-dimensional array of points having known coordinates corresponding to the pixels on the raster display. In its simplest form, Frame Buffer 50 comprises a continuous block of memory which is allocated such that each memory location is mapped onto the corresponding pixel on the raster Display Device 24. Memory 16 also includes a variety of other Programs 54 for execution by the CPU 14. For example, a variety of control, display, and calculating programs implementing the operations and routines described in this specification may be stored in Memory 16, as well as monitor control programs and disk operating systems. Moreover, Memory 16 further includes space for other programs and spare Memory (56) which may be used for a variety of other functions and operations in data processing systems.

Figure 3:
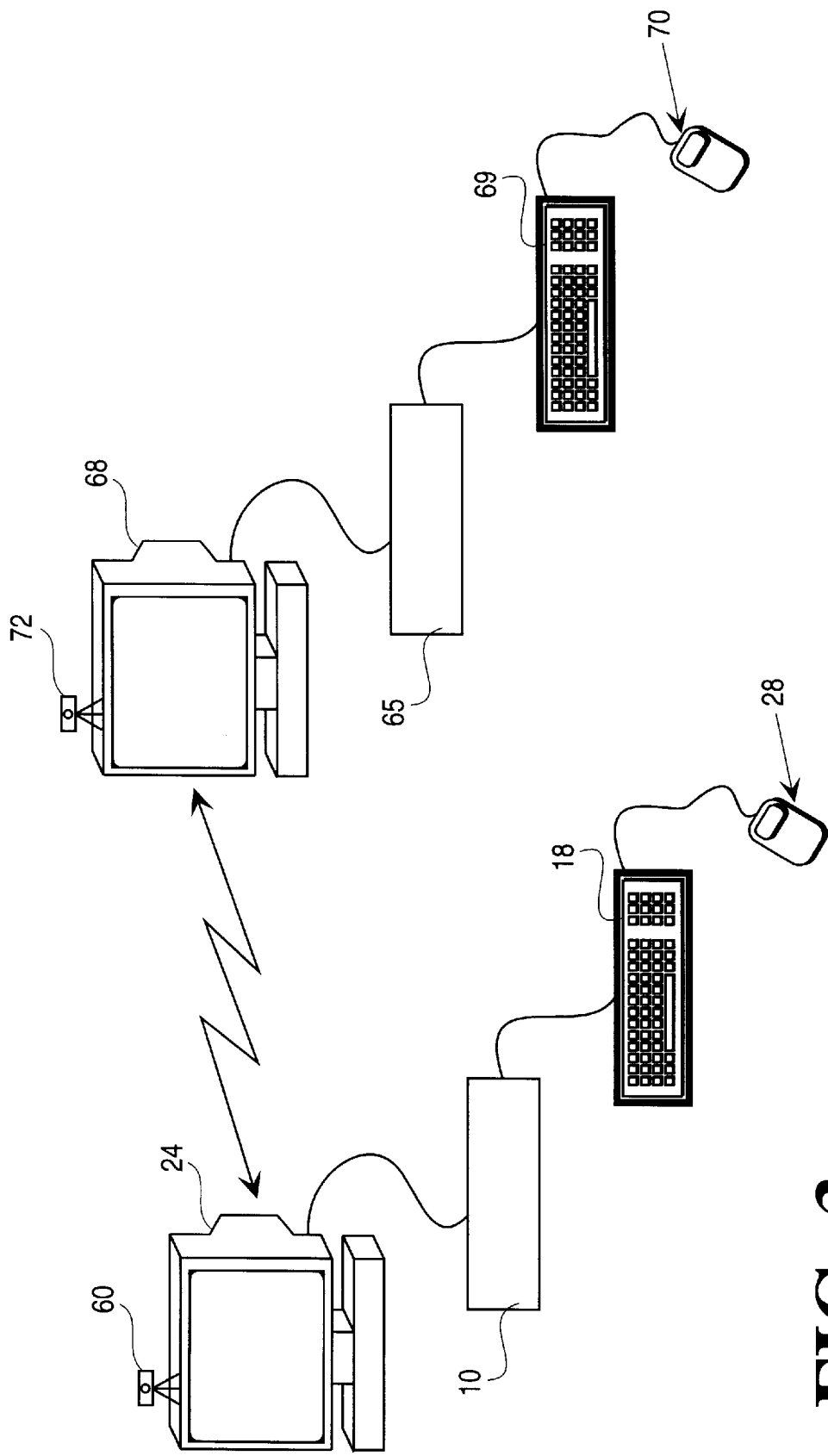
FIG. 3 illustrates a video conferencing system in accordance with the teachings of the present invention.

Referring now to FIG. 3, the computer system illustrated in FIG. 1, and the present invention as herein below described, may be included in an electronic conferencing system as diagrammatically illustrated in FIG. 3. As shown, the system of FIG. 1 further includes a Video Camera 60 which is coupled to the Computer 10. The Computer 10 is electronically coupled for communication with a second computer system for generating and displaying graphic images. The second system illustrated in FIG. 3 includes a Computer 65 which is coupled to a Display Device 68 and a Keyboard 69. The computer system illustrated is substantially similar to that previously described with reference to FIG. 1. A Cursor Control Device 70 is coupled to computer 65 through the Keyboard 69, and the system includes a Video Camera 72, including a microphone (not shown) coupled to the Computer 65. This system may also include a headset (not shown) which has a built-in microphone for speaking to others in the conference and a built-in speaker for listening to others in the conference. As is known, the video conferencing system illustrated in FIG. 3 permits a user operating the Computer 10 to view a user, document or other object within the field of view of the Camera 72 coupled to the Computer 65. Similarly, a user operating a Computer 65 may view the user of Computer 10, a document or other object within the field of view of the Video Camera 60. In addition, the output from software applications running on, for example, Computer 10, may be simultaneously viewed on Display 24, as well as Display Device 68 coupled to Computer 65.

The nature of the communication link between the Computer 10 and the Computer 65 may be over a local area network, fiber optic link, satellite link or other electronic communication link. Use of the electronic conferencing system illustrated in FIG. 3 permits the participants to conduct business or scientific meetings without the necessity of traveling, perhaps long distances, to meet in person. As will be described, the present invention has application to any window-based graphic user interface display system, and particularly, the present invention is described with reference to an electronic conferencing application. However, it will be appreciated that the present invention is not limited to use in an electronic conferencing environment, but is described with respect to an electronic conferencing application so as to provide a full and complete disclosure of the present invention.

Persistent Conference Object

Figure 4:
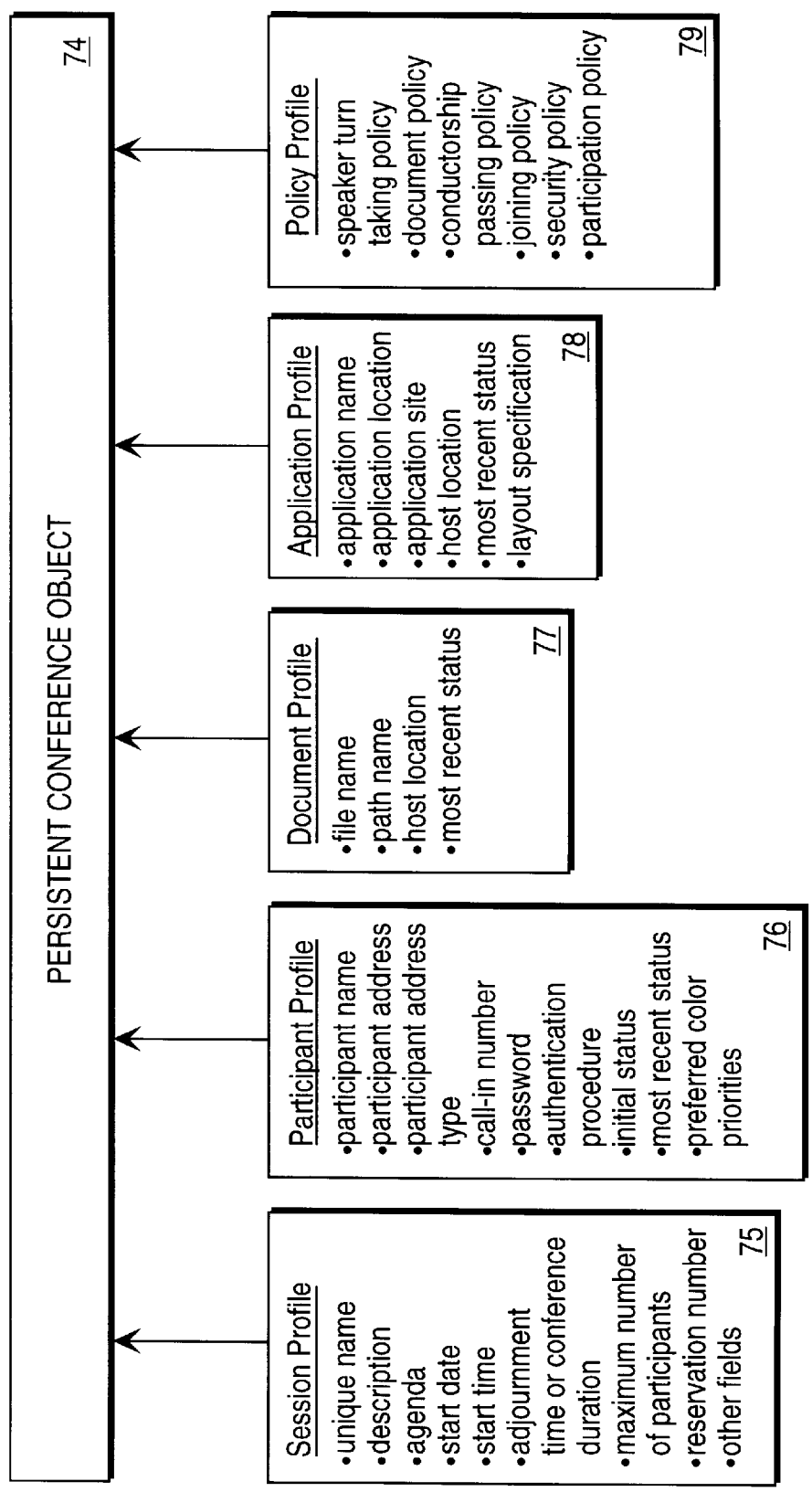
FIG. 4 illustrates one embodiment of the persistent conference object of the present invention.

Referring now to FIG. 4, a persistent conference object 74 of the present invention will be illustrated. A persistent conference object 74 is a data structure that contains the information necessary to dynamically establish a conference environment for a live conference. The persistent conference object 74 or file includes four broad categories of information. First, a persistent conference object 74 stores information about the participants of a conference. Second, the persistent conference object 74 also stores information concerning software applications that will be used during the conference. Third, the persistent conference object 74 stores those documents which will be discussed and/or edited during a conference. Last, the persistent conference file stores policies that will be used to manage the conference.

In addition to the above four categories of information, the persistent conference object 74 may also contain general information about the particular conference.

In a preferred embodiment, the persistent conference object 74 includes the following sub-objects: a session profile 75, several participant profiles 76, several document profiles 77, several application profiles 78 and several policy profiles 79.

Conference Information

Each session profile 75 may have a unique user-determined name or identifier. Each session profile 75 may also have a description that describes the goal(s) and objective(s) of the conference. This multi-word field may be used by those who may want to join a conference to quickly identify the purpose and subject of the conference. The session profile 75 may also include a multi-paragraph description of the specific agenda of the conference. This may be maintained as part of the session profile 75 or separately in a document that is referred to by the session profile 75.

The session profile 75 may also specify the start date and start time of the conference, expressed as a universal date and time. The universal date and time ensures that participants who span time zones and international date lines can accurately determine the actual start time of a conference. Similarly, the session profile 75 may include an adjournment time of the conference. The planned conference duration may also be stored in the session profile 75. The planned duration information is necessary to reserve time slots. Users reserve time slots on the MCU (a computer that manages conferences) to guarantee that participants can be connected into a conference at a particular start date and time.

The maximum number of participants at any point during the conference may also be stored in the session profile 75. Also, the manner used to connect to the conference may be stored. For example, one manner is for all the participants (invitees) to call the conference. An alternate manner is for a desktop conferencing software to call all the invited participants into a conference.

A reservation number, which acts as a unique conference identifier, may be assigned to each conference and stored in the session profile 75. This unique reservation number is useful for a host or another participant to cancel a scheduled conference.

There may be additional fields reserved in the session profile 75 to store miscellaneous comments describing a conference. These fields may be used by potential participants when browsing session profiles or reviewing the contents of a particular session profile 75. Browsing and reviewing contents of a session profile 75 will be described in greater detail later in the Detailed Description.

Participant Information

The persistent conference object contains sub-objects for each participant called a participant profile 76. There is a participant profile 76 for each participant in the conference. The participant profile 76 may include a participant's name, address, address type (i.e., electronic mail and/or home address), and a call-in number. A call-in number or a bridge number is simply a number which all participants must call to join a conference. For example, if all the participants call an identical number to connect to a conference, then each participant will have the same number stored in the call-in number field. Similarly, if each user calls a different number to connect to a conference, then each participant will have a different value in the call-in number field.

The participant profile 76 may also store a password, which must be supplied by any user who wishes to join the conference.

Another security measure is to store within the participant profile 76 an authentication procedure. This authentication field provides a way to verify a participant's identity (i.e., the maiden name of one's mother if used). A number of alternate authentication procedures may be implemented.

The participant profile 76 may also store an initial status and a most recent status of a participant. The status fields may be a simple Boolean field indicating whether or not a participant is active or not active. The most recent status of the participants may be used to determine which of the participants should be automatically connected when a conference is dynamically resumed.

Another field which may be stored in the participant profile 76 is the preferred color priorities of a participant. Each participant has a specific color which identifies each of the participants when annotating and/or telepointing (e.g. where a user uses a local cursor control device to annotate within the conference environment).

Other fields which may be stored in the participant profile include the participant-operation profile. Values in the participant profile determine what operations the participant may perform on the various conference subobjects.

Document Information

For each document there is a document profile 77 which may contain a file name, a path name, a host location, and a most recent status. The file name and the path name are used to find the document at a later time. The host location specifies where to execute an application that is to be accessed and/or used with the file. The most recent status indicates whether or not the document is currently active or inactive.

Application Information

For each application there is an application profile 78 which may include an application name, an application's location, site, and path name, an identification of a host's location, a most recent status, and an initial layout specification of the application.

The application name identifies an application to be used during the conference, but are not registered by the conference manager program. The host location specifies the site where the application will be executed. The most recent status indicates whether the application is currently executing or is non-active. The initial layout specification describes where on the screen and how this application should be presented when the application is invoked.

Policy Information

Policy information stored in a policy profile 79 may include turn-taking protocols that will govern a conference. These turn-taking protocols establish the rules and guidelines to be followed by each participant when his/her turn to speak arises.

For each document, there is a document policy describing how the document may be passed between the participants and who initially has the document. These document policies (i.e., a document baton) may also be stored in the policy profile 79.

A conductorship baton that describes how the conductorship of a conference may be passed between various participants, and which of the participants initially has the conductor baton may also be stored in a policy profile 79.

The policy profile 79 may also store joining policies that generally describe how the various participants may join a particular conference. For example, the use of passwords and other security techniques to only allow certain participants to join a conference are several important joining policies.

Similarly, the policy profile 79 may store security policies that regulate who may participate in a conference. For example, a programmer may choose to have three levels of security for a desktop conference. The three levels, level 0, level 1 and level 2, represent the level of security for a particular conference. Level 0 may indicate that anyone may attend or join a particular conference. A conference with such a security level may appear on a conference bulletin board where any potential participant may view this bulletin board and join a conference. A conference having level 1 security may allow only invited participants to attend. A level 1 security conference may still appear on a conference bulletin board, but only invited participants will be able to join the conference. All others will be unable to participate in that conference. A level 2 security conference limits the participants to only those who are invited. Moreover, a level 2 conference would not even appear on the conference bulletin board. Thus, those who are uninvited will not even know that a particular conference will take place.

The above-described policy fields that may be included in a policy profile 79 are described to illustrate the different types of information that may be stored in a policy field within a persistent conference file. It should be appreciated that the present invention is not limited to storing and manipulating the types of information discussed above.

Conference Manager

The present invention allows a user to create, save, retrieve, edit a persistent conference object and to dynamically initiate a conference.

Figure 5:
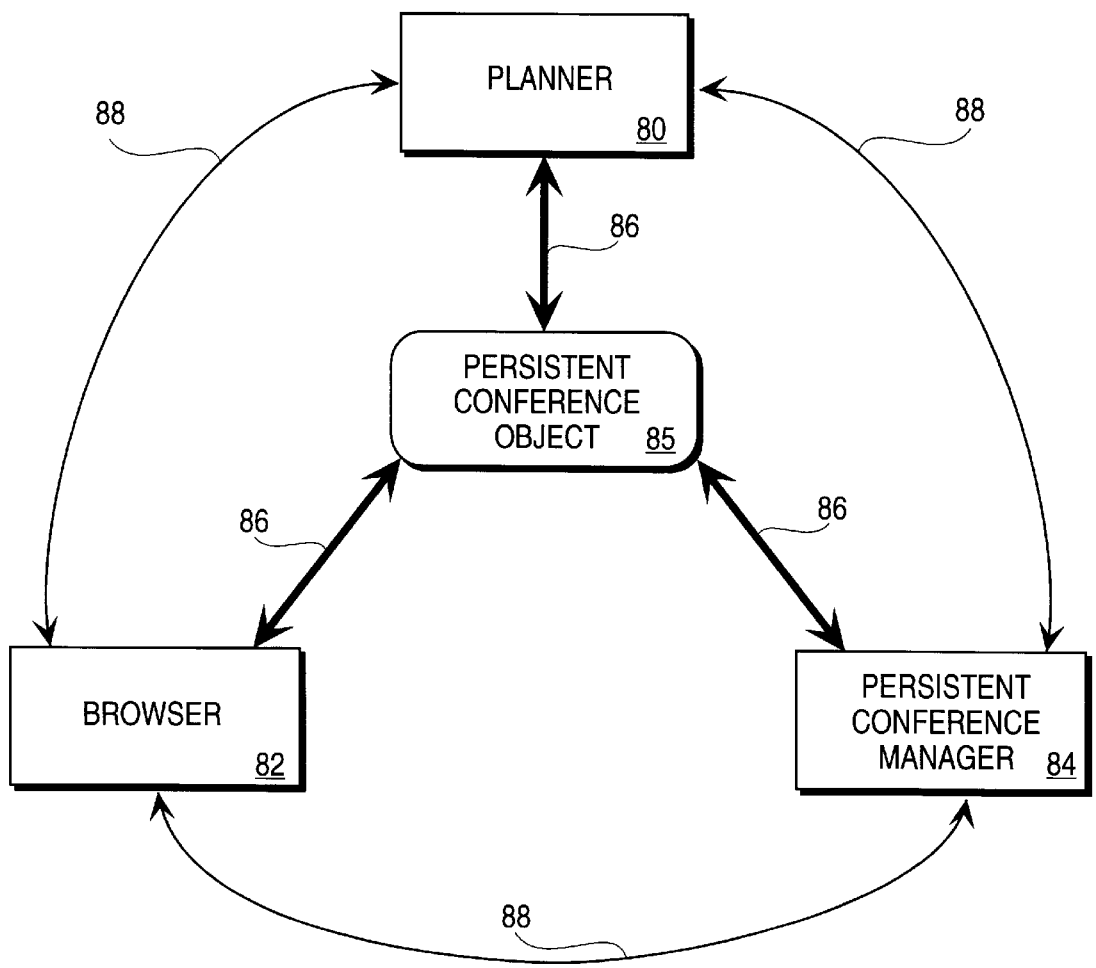
FIG. 5 illustrates one embodiment of how the teaching of the present invention are implemented in various applications that manipulate a persistent conference object.

Referring now to FIG. 5, how a number of conference applications 80, 82, 84 employing the teachings of the present invention, interact with each other and with the persistent conference object 85 (previously referred to as element 74 with reference to FIG. 4) will now be described. In one embodiment, the present invention may be implemented by a Planner Application 80, a Browser Application 82, and a Persistent Conference Manager Application 84. Each of these applications access (i.e., read from, modify and write to) the persistent conference object 85 through a data path 86, and these applications pass control from and to each other through control paths 88.

The Planner 80 may simply be an application used by an individual to schedule and plan a conference by specifying conference parameters and storing them into a persistent conference object 85. The present invention allows an individual, using the Planner 80 to specify participant information, application information, document information, and also, policy information pertaining to a conference. Each of these different types of information was described previously.

A Browser 82 may be an application used by an individual to examine a collection of persistent conference objects 85. The Browser application 82 allows a user of a desktop conferencing program to browse a selected number of fields in a persistent conference object. For example, one parameter that is accessible to a browser is a conference state. A conference state is simply an indication of whether a conference is planned, active, suspended, or terminated. Other parameters that a user may browse include conference agenda, applications associated with the conference, documents associated with the conference, and policies governing a conference session. FIG. 4 illustrates the parameters which may be browsed.

In this embodiment, a Persistent Conference Manager 84 may be an application that controls an active or ongoing conference. The Persistent Conference Manager 84 enables a user to initiate an ad hoc conference, suspend or terminate an active conference, and generally control the activities within a conference. These activities may include adding and deleting documents, and booking and terminating conference-labeled applications, inviting, admitting and ejecting participants, and setting or resetting conference policies.

The Planner 80, Browser 82, and Persistent Conference Manager 84 interact with each other in several ways. For example, after a user uses the Planner Application 80 to completely specify desired conference parameters and to store these parameters into a persistent conference object 85, the user may then invoke the Persistent Conference Manager 84 to dynamically establish the specified conference parameters stored in the persistent conference object 85. For example, the Persistent Conference Manager 84 would connect the invited participants, initiate the specified applications, open the appropriate documents, and enforce the specified conference policies.

From the Planner Application 80, the user may also invoke the Browser Application 82. For example, the user may review other persistent conference objects in Browser 82 and import policies, invited participants, documents and/or applications into the persistent conference object 85 currently being planned from persistent conference objects listed in the Browser 82. When a user is browsing active conferences in Browser Application 82, the user may discover an active conference that he desires to join. If an invitation policy permits, the user may connect to the active conference by invoking the Persistent Conference Manager 84. The Persistent Conference Manager Application 84 enables a user to become a participant of an active conference from the Browser 82 and enables the user to interact with the active conference.

One may also invoke the Planner Application 80 from the Browser Application 82 to plan a conference while browsing a list of conferences. As mentioned previously, a user may copy policies, invited participants, documents and/or applications from an existing persistent conference object 85 into a conference object that is being planned.

A conference participant may invoke the Planner Application 80 from the Persistent Conference Manager Application 84 to plan a new conference from within an active conference. For example, a participant may ask other participants in the active conference information about the conference being planned (i.e., time they are available, documents and applications that should be included, and special conference policies that are required). A conference participant may also invoke the Browser Application 82 from the Persistent Conference Manager 84 to review other persistent conference objects. For example, an active conference participant may browse other active conferences to (1) determine which conference to attend, (2) determine if a previous conference discussed a similar topic to the current active conference, or (3) determine if a planned conference can be canceled because of the results achieved by the current active conference.

In summary, in this embodiment, the Planner 80 allows a user to create, save, retrieve and edit a persistent conference object 85 and to pass control 88 to the Persistent Conference Manager Application 84, which dynamically establishes the conference parameters specified in a persistent conference object 85. The Planner 80 also transfers documents to be used during conference to a user for review prior to initiation of the conference.

The Browser 82 allows a user to examine a list of scheduled conference sessions and select one of those persistent conference objects, representing the conference session, to review, to identify documents to review prior to initiation of the conference, and to pass control 88 to the Persistent Conference Manager Application 84, which dynamically establishes the conference parameters of a selected persistent conference object. Moreover, the Browser 82 allows a user to examine a list of terminated conference sessions and to pass control 88 to the Persistent Conference Manager 84 for the purpose of resuming (i.e., dynamically establishing) a terminated conference.

Creating A Persistent Conference Object

A user can create a persistent conference object in one of two situations: (1) prior to a conference, and (2) during a conference.

Prior to a Conference

Prior to an actual conference, a user may use, in one embodiment, a combination of the Browser 82 and Planner 80 applications, as described previously. In an alternative embodiment, a Persistent Conference Manager may incorporate all the features of the browser, planner and conference manager applications described previously. In this embodiment, a user may use the Persistent Conference Manager program to create, edit, store, and retrieve the persistent conference object.

For example, a user can choose an option within the Persistent Conference Manager to input the various conference parameters discussed above into a persistent conference object. After the pertinent conference parameters have been inputted into the persistent conference object, the present invention embodied in Conference Manager will prompt the user for an identifier which will identify this particular persistent conference object. Once a unique identifier has been assigned to a persistent conference object, the particular conference parameters that were inputted by the user, may be accessed through the persistent conference identifier at a later time by the user.

A conference object permanently resides on disk 20. To access the conference object, the planner, browser, and persistent conference manager retrieve the conference object from disk 20 and place a copy of the conference object in memory 16. The planner, browser, and persistent conference manager update values of the conference object in memory 16. To make these revised values permanent, the planner, browser, and persistent conference manager copy the conference object in memory 16 to disk 20 by performing a "save" command.

After a persistent conference object has been created and saved to disk 20, the present invention allows a user to retrieve the persistent conference object from disk 20 to Memory 16 at a later time. After a persistent conference object is retrieved from disk 20 to Memory 16, the present invention allows a user to edit the contents and the various fields of the persistent conference object or to append additional information to the persistent conference object. After the persistent conference object has been updated in accordance to the user's preferences, the present invention, as embodied by the Persistent Conference Manager, allows the user to store updated information into the persistent conference object from Memory 16 onto disk 20 with a file identifier, specified previously, or to store the updated persistent conference object in Memory 16 to a newly identified persistent conference object on disk 20. In other words, the Conference Manager allows the user to perform a "SAVE" command and also a "SAVE AS" command.

During a Conference

A user can also create a persistent conference object during a live conference. At any time during a conference, a participant may save the conference parameters, which establish the conference environment, into a persistent conference object on disk.

Figure 6:
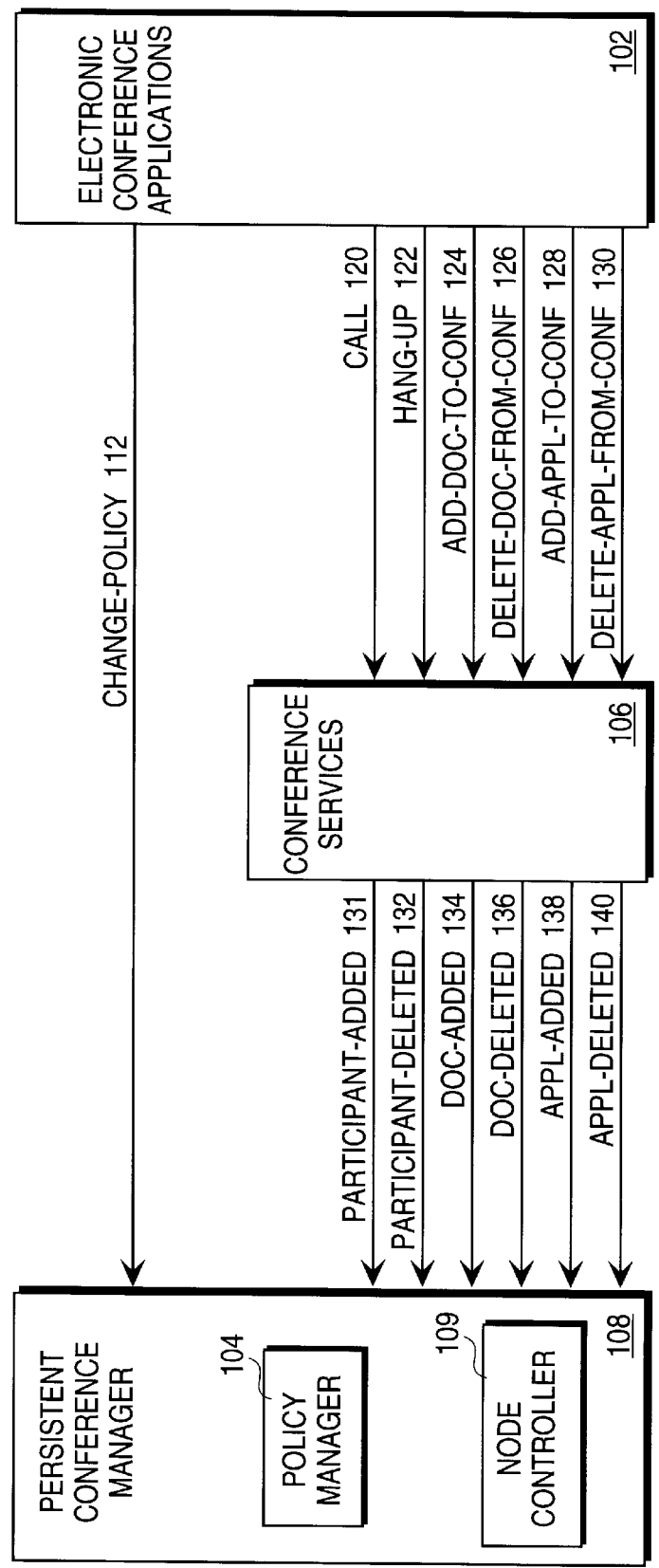
FIG. 6 illustrates in block diagram form how the present invention may be implemented in a video conferencing system.

The conference manager monitors the various conference parameters (i.e., participants, documents, applications and policies). Whenever a change in one of the conference parameters occurs, the conference manager detects the change and stores the updated information into the persistent conference object in memory as illustrated in FIG. 6.

The conference manager interacts closely with the operating system of the computer to identify and track the status of the various conference parameters. For example, an operating system is aware at any one instance of time which applications and documents are opened, and what policies are in place. When a document or application is opened or closed, the operating system will update its status concerning which applications/documents are active or inactive. Similarly, a communication application will at all times know the number of participants who are currently connected and their respective identification.

The conference manager may use the operating system identification scheme for applications, documents and user policies. In the alternative, a desktop conference application may be written to assign different identifications for the applications, documents and user policies from the operating system. The conference manager may choose either of these two identification schemes to monitor changes in conference parameters.

A participant may be identified either by his/her name, telephone number, electronic mail address or other unique identifier. The conference manager may track the status of the conference participants by identifying the participants with any of the above mentioned identifiers and track the status of the participants accordingly.

A communications application can provide the conference manager the status of the various conference participants. For example, when a new participant joined a conference, the conference manager will detect that a new participant has joined the conference. Similarly, when a participant disconnects and leaves a conference, the conference manager will detect that a certain participant, as identified by his name, number or electronic mail address, is no longer part of the conference.

The conference manager will automatically update the various conference parameters when those particular parameters change. When a particular application (i.e., word processing application, or spreadsheet application) is opened or closed, the conference manager will update the status in the persistent conference object in memory in an appropriate manner, so that the information stored in the persistent conference object in memory accurately reflects the conference parameters at that point in time. In a similar fashion, the conference manager detects changes and the status of documents, and user policies, and correspondingly makes the appropriate updates to the respective fields in the persistent conference object.

A user at any point during a live conference may save the conference parameters, as they existed at that moment in time, into a persistent conference object on disk. Moreover, at the close of a conference, before the participants sign off, the present state or the present conference environment may be saved in the persistent conference object on disk by a user-initiated command. This persistent conference object, which stores the conference environment at that point in time, may be recalled in the future by a user to automatically create the same conference environment. This "Resume" conference feature will be described in further detail in a later section.

Establishing a Live Conference Environment

With the present invention, a user may establish a live conference environment into two ways. First, a user may manually establish the desired conference parameters. In other words, a user may physically perform those steps necessary to establish a connection between the conference participants and establish the conference parameters. For example, a user may call each of the individual participants, open the applications that will be used during the conference, open the various pertinent documents that will be discussed during the conference, and establish all the conference policies (i.e., setting the baton passing, joining, security, and other policies governing how a conference is to take place).

The present invention, embodied in a persistent conference manager, enables the user to establish a live conference environment in a second way. Instead of having to physically establish all the conference parameters, the present invention enables a user to retrieve a persistent conference object from disk containing the desired conference parameters, and select a "resume" or "begin conference" command that dynamically establishes a conference environment with the parameters stored in a persistent conference object in memory as will be described with reference to FIG. 9.

The persistent conference manager first prompts the user for the name of the persistent conference object on disk, containing the conference parameters desired for this particular live conference. Next, the conference manager allows a user to select a command that dynamically establishes a live conference environment.

Upon receiving the executed command, the Persistent Conference Manager 108 performs a number of steps. First, the Persistent Conference Manager 108 opens the identified persistent conference object on disk and reads all the relevant conference parameters. Second, the conference manager connects all intended participants to the conference by locating the participants' telephone numbers and calling each of the participants. Third, after establishing a communication link between all the participants, the Persistent Conference Manager 108 initializes the various policies of that particular conference.

Fourth, the Persistent Conference Manager 108 opens those applications and documents, which were opened at the time the persistent file was saved.

In another embodiment, instead of the Persistent Conference Manager 108 opening all those applications and documents which were opened in a previous conference environment, the Persistent Conference Manager 108 simply appends the application names and document names to two separate lists. A first list, called the document list, lists those documents which were opened at that point in time in the previous conference. A second list called the applications list will list those applications which were opened at the previous conference at a particular point of time. The participants can then access these lists and select from those documents which they want to activate.

Referring now to FIG. 6, how the present invention may be implemented into a desktop conferencing program will be illustrated. FIG. 6 shows how the attributes of conferences are monitored to maintain the conference object. Every desktop conference software package includes a number of Electronic Conferencing Applications 102 for providing specific services to the desktop conferencing software. For example, Electronic Conferencing Applications 102 may include operating system services to the desktop conference application and other applications within the desktop conferencing package. Electronic Conferencing Applications 102 may also include a notebook application where documents and applications may be shared among the participants. Other desktop conferencing applications include file transfer, shared editor, image transfer, and applications originally designed for a single user that have been modified to support multiple users at the same time.

The Electronic Conferencing Applications 102 communicate with a Policy Manager 104 that may be implemented in a Persistent Conference Manager 108. The Applications 102 use the Policy Manager 104 to set policies and to obtain a current status of a particular policy. Change Policy Signal 112 represents communication between the applications and the Policy manager 104 with respect to setting and reading the various policies in effect. When dynamically establishing a conference environment, the Persistent Conference Manager 108 may read the policies from a persistent conference object and set these policies by using the Policy Manager 104.

The Policy Manager 104 not only records changes in policies that are initiated by the node on which the Policy Manager 104 resides, but also updates the other policy managers on other nodes (i.e., other participants of the conference), so that all policy managers on all nodes reflect any change in the policies. After all the policy managers on the various nodes are updated, the policy manager modifies/updates the persistent conference object.

Applications 102 also provides a number of signals to Conference Services 106. These signals include Call 120, Hang-Up 122, Add_Document_To_Conference 124, Delete_Document_From_Conference 126, Add_Application_To_Conference 128 and Delete_Application_From_Conference 130.

Call 120 and Hang-Up 122 are commands that are generated by one or more of the applications 102 and usually are initiated by a user/conference participant and provided to Conference Services 106. To establish a communication link with another node or participant, an application simply sends the Call Command 120 to Conference Services 106. A node is an endpoint (such as a computer) with which a participant interacts. In response to this "Call" command, Conference Services 106 establishes a communication link between the node making the call and the node being called, or between a conference and the node being called, by physically calling a new participant. Similarly, to disconnect one node from the conference, an application 102 simply provides the Hang-Up Command 122 to Conference Services 106. In response to "Hang-Up", Conference Services 106 terminates the communication link between the node requesting the hang up command and the other node(s) in the conference. In summary, the Call 120 and Hang-Up 122 commands request that Conference Services 106 either establish a communication link with another node or disconnect from another node of a conference.

With respect to documents, Add_Document_To_Conference 124 and Delete_Document_From_Conference 128 are signals from one of the applications 102 that informs Conference Services 106 that a particular document is now being added to or deleted from the conference environment. Conference Services 106 receives these signals from one of the applications 102 and updates all conference services at the different nodes, so that all nodes are aware of those documents which are currently part of the conference.

With respect to applications, when an application (i.e., word processing program, spread sheet program) is added to a conference, the operating system or supervisory application 102 sends an Add_Applicant_To_Conference 128 to Conference Services 106. Similarly, the operating system or supervisory application 102 will send a Delete_Application_From_Conference 130 to Conference Services 106 when an application is deleted from a conference. Conference Services 106 in response to the Add_Application_To_Conference 128 and Delete_Applicant_From_Conference 130 will update conference services at each node on the status of the applications which are currently part of the conference.

After Conference Services 106 has processed the various commands from the electronic conference applications, Conference Services 106 sends a number of signals to the Node Controller 109 within the Persistent Conference Manager 108.

To keep track of all current participants in a conference, Conference Services 106 sends the signals: Participant_

Added 131 and Participant_Deleted 132 to the Node Controller 109. Participant_Added 131 differs from Call 120, which is merely a request to place a call, in that Participant_Added 131 indicates that a communications link was established and that a participant has been added to the conference.

In contrast, Call 120 is simply a request for Conference Services 106 to attempt to establish a communication link. For example, a Call 120 signal may not necessarily lead to Participant Added 131 (i.e., a party called may not accept the call). Similarly, Participant_Deleted 132 indicates that a prior participant has now disconnected from the conference. The Conference Manager 108 also receives Document_Added 134 and Document_Deleted 136 signals. Conference Services 106 generates Document_Added 134 when a document has been added to the conference at some node, which is not necessarily the node on which this conference services is running. Document_Deleted 136 indicates that a document has been deleted by one of the nodes in the conference.

When an application is added to the conference on some node, not necessarily this node, the Application_Added signal 138 is generated by Conference Services 106 and sent to Node Controller 108. Similarly, when an application is deleted from the conference on some node, which is not necessarily the present node, the Application_Deleted 140 signal is generated by Conference Services 106 and sent to Node Controller 108.

Node Controller 109, in conjunction with Conference Services 106 acts as an interface between the electronic desktop conferencing applications 102 and the operating system of that particularl node. The Node Controller 109 is the entity that controls all conferencing operations for a node. Functionally, it is part of the Conference manager application 108. The Node Controller 109 sits between the Conference Manager 108 and Conference Services 106. It provides operations like create, join, and terminate a conference, add and invite participants, and accesses to the application and participant rosters.

The present invention may be implemented in the Node Controller 108. The present invention maintains a list and dynamically tracks the participants of a conference. This list is changed and updated in response to Participant_Added 130 and Participant_Deleted 132 signal from Conference Services 106. The present invention a lso dynamically maintains and updates a list of applications that are currently part of the conference. This application list is updated and changed in response to Application_Added 138 and Application_Deleted 140 signals from the Conference Services 106. The Node Controller 108 also dynamically updates and maintains a list of open documents currently in a conference. This document list is updated and changed in response to the signals, Document_Added 134 and Document_Deleted 136.

These lists, along with the policies, managed by the Policy Manager 104, together comprise the persistent conference object 85 that includes participant information, application information, document information and policies.

Figure 7:
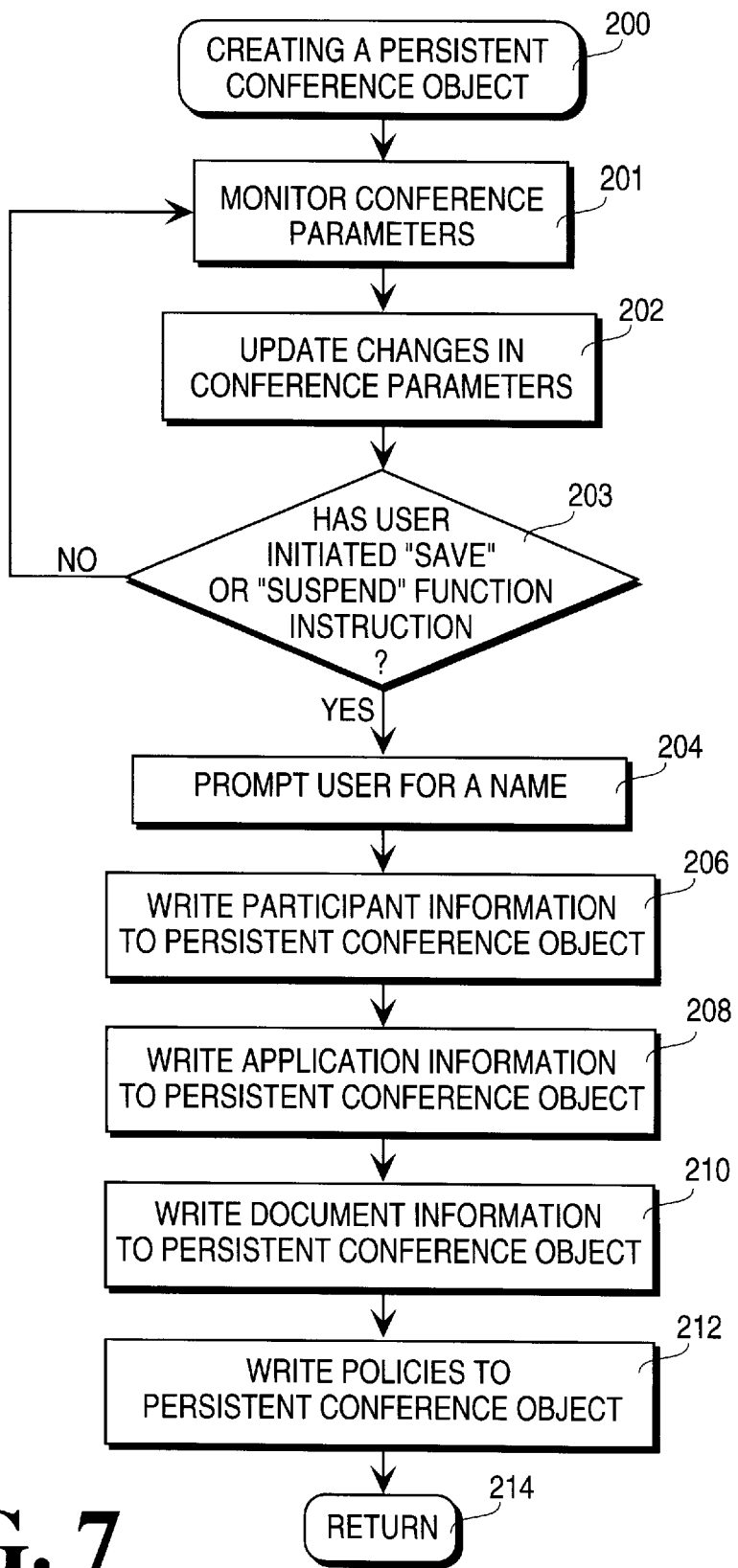
FIG. 7 illustrates the processing flow for creating a persistent conference object.

Referring now to FIG. 7, the processing steps, followed by the Persistent Conference Manager 84, for creating a persistent conference object from the planner, browser or persistent conference manager are illustrated. During an ongoing conference, the various conference parameters of the active conference are monitored 201, as illustrated in FIG. 6. The present invention also updates any changes in the conference parameters 202. In decision block 203, the determination is made as to whether or not a user-initiated triggering event has occurred. If a user has not initiated a save/suspend instruction, processing logic returns to processing block 201 and loops between processing blocks 201 and 203 (i.e., an ongoing monitoring and updating of the conference parameters).

If a user has initiated a save/suspend instruction in decision block 203, the processing logic proceeds to processing block 204. In this block, the Persistent Conference Manager 84 prompts a user for a name of a persistent conference object to which the conference parameters should be stored 204. The present invention then proceeds to write the participant information 206, the application information 208, the document information 210, and the conference policies 212 to the specified persistent conference object on disk. The process control then returns 214 either to processor block 201 if the present conference is still active, or to another processing block of the calling program/routine if the conference is terminated.

Figure 8:
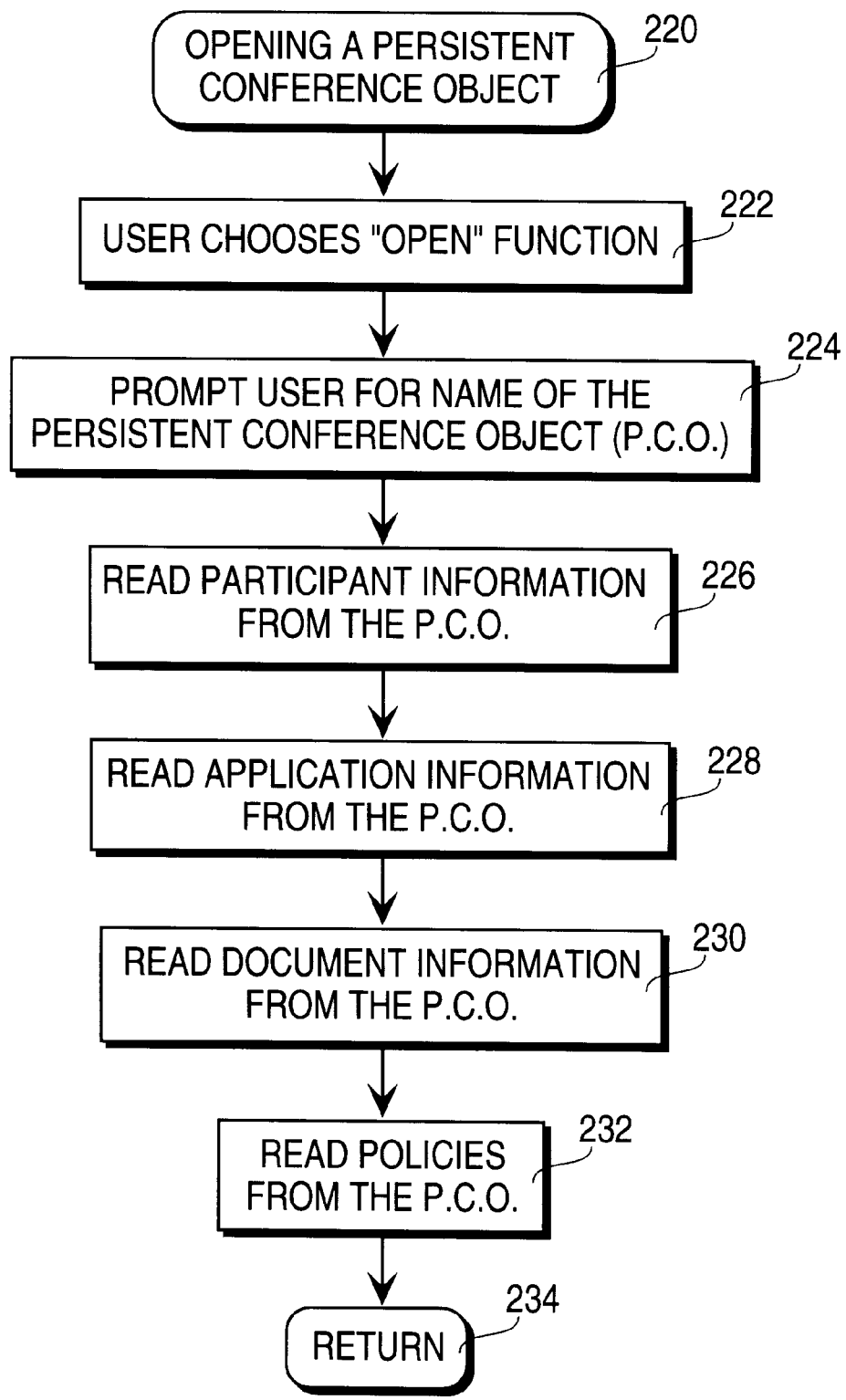
FIG. 8 illustrates the processing flow for opening a persistent conference object.

Referring to FIG. 8, the processing steps 220 for the Persistent Conference Manager 84 to open a persistent conference object from the browser, planner, or persistent conference manager object are illustrated. A user may initiate the opening of a persistent conference object 222. In response, a Persistent Conference Manager 84 will prompt the user for the name of the persistent conference object 224. The Persistent Conference Manager 84 then reads the participant information 226, the application information 228, the document information 230 and the policy information 232 from the persistent conference object on disk. The process control then returns to a program that called for the opening of a persistent conference object.

Figure 9:
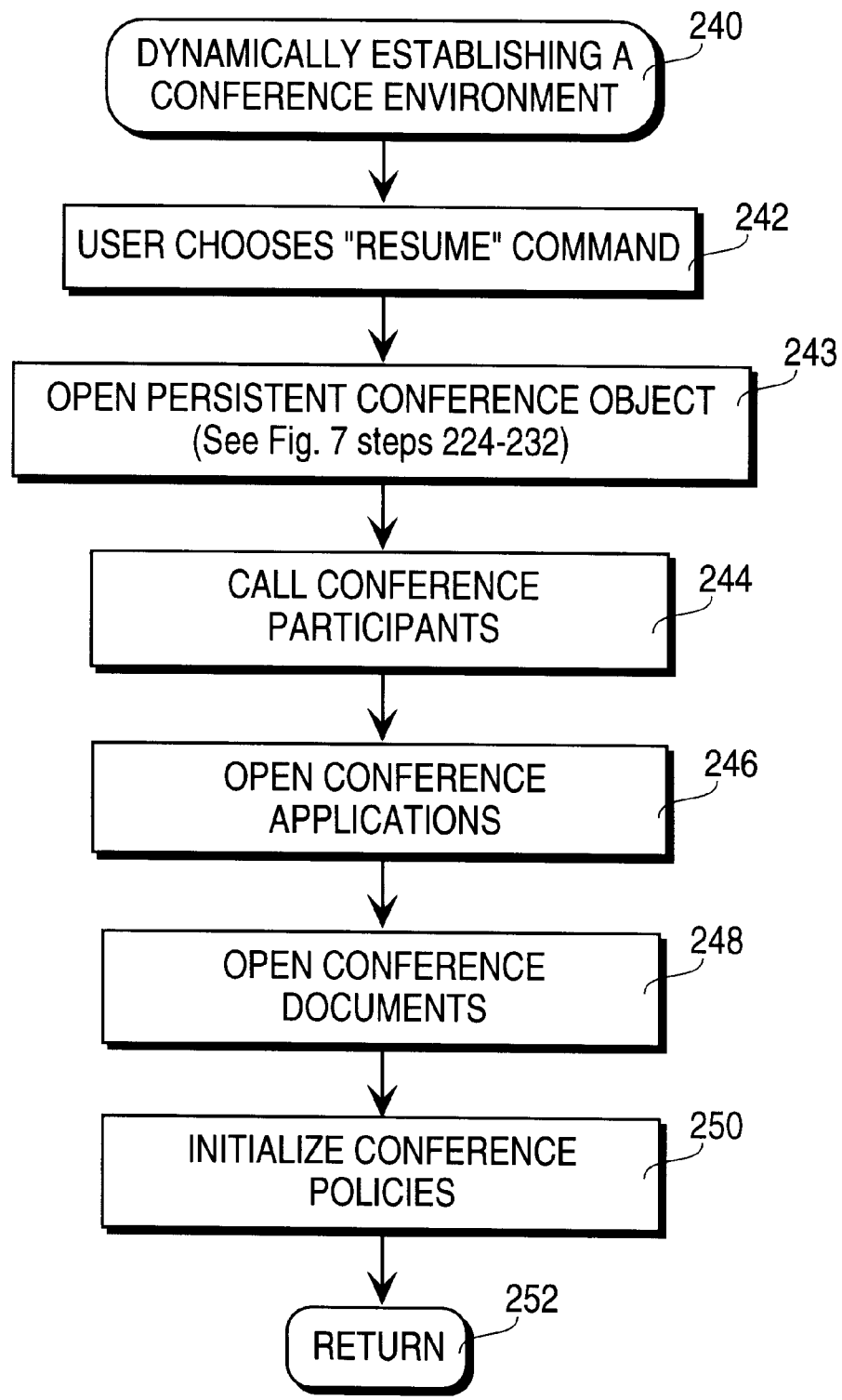
FIG. 9 illustrates the processing flow for dynamically establishing a conference environment.

FIG. 9 illustrates the processing steps for the Persistent Conference Manager 84 to dynamically establish a conference environment 240. A user selects and initiates a "Resume" command 242. In response to this user-initiated command, the Persistent Conference Manager 84 opens the persistent conference object in accordance with steps 224 to 232 of FIG. 8. After processing block 243, the Persistent Conference Manager 84 calls the conference participants 244, opens the specified conference applications 246, opens the relevant conference documents 248 and initializes the conference policies 250. Once the conference parameters are read from the persistent conference object on disk in processing block 243, the Persistent Conference Manager 84 establishes the communication link between the participants 244 and initializes the conference policy that will govern the conference 250. It should be noted that although processing blocks 246 and 248 specify that the Persistent Conference Manager 84 opens both conference applications and conference documents, in the alternative, a list of the applications available to a particular conference, and a list of the documents available to the conference participants may be specified in place of opening the applications and documents. In this manner, a participant (participants) may select and choose those applications and documents to use during a conference, by recalling a "pull-down" list that could be included in the menu bar of a desktop conferencing program.

This participant profile also includes a participant-operation profile for each participant. Values in the participant-operation profile determine what operations the participant may perform on the various conference subobjects and attributes. Sample fields in a participant-operation profile are shown in Table I.

Table I

PARTICIPANT-OPERATION PROFILE/*describes what operations the participant is allowed to perform/*

May invite participants /*participant may invite other participants to join the conference*/

May eject participants/*participant may eject participants from the conference*/

May change color of participants/*may change the color assigned to conference participants*/

May add/delete applications to the conference

May add/delete documents to the conference

May start and stop the recorder

May change start time

May change start date

May change adjournment time

List of documents and applications which the participant may edit

List of documents and applications which the participant may scroll

List of documents and applications which the participant may cloak (hide from other participants)

Policy List

The policy manager program of the present invention verifies whether a participant is authorized to submit a request to change subobject and attribute values in the following manner: First, a user submits a command to change a subobject or an attribute. Second the policy manager examines the participant profile of that user to determine whether or not the user is permitted to change the subobject or attribute. Third, if the answer is yes, then the policy manager carries out the change by modifying the subobject or attribute value in accordance with the user's command. Fourth, if the answer is no, then the policy manager generates an error message to the user that informs him that he is not allowed to make the change.

In another embodiment, the user is presented with a graphical user interface (GUI) that only enables the user to submit commands that are permitted by the participant profile of that user. Whenever a change in the participant-operation profile is made, the GUI is dynamically modified to reflect the changes. For example, if Joe's participant-operation profile enables Joe to modify the adjournment time, then Joe's GUI has a dialog box for changing adjournment time. When the participant-operation profile is changed so that Joe may not modify the adjournment time, then the dialog box in Joe's GUI is grayed out and can no longer be used by Joe.

Figure 10:
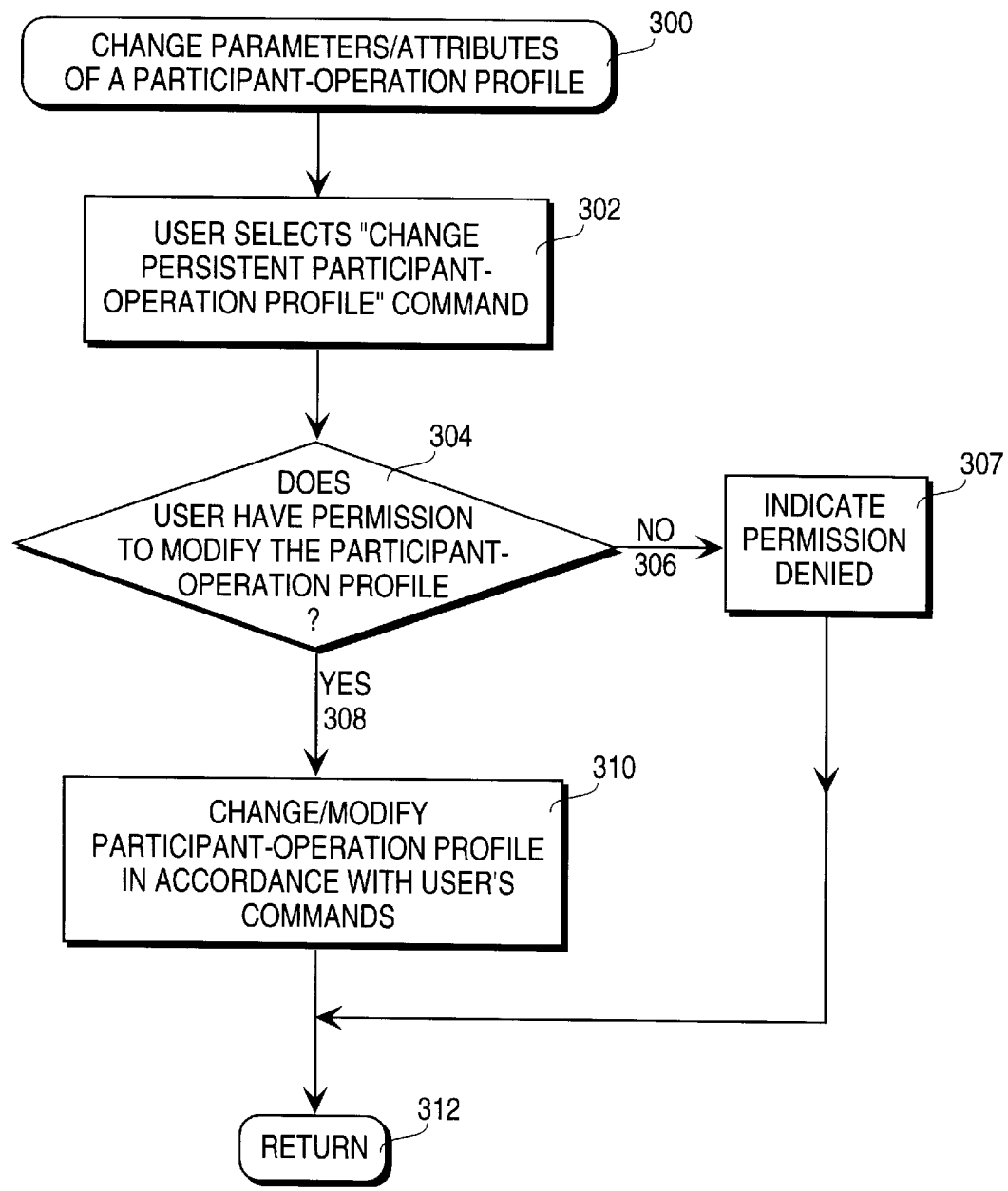
FIG. 10 illustrates the processing flow for changing the parameters/attributes of a persistent conference object.

FIG. 10 illustrates the processing steps to change a participant-operation profile's parameters/attributes 300. A user first selects a change command indicating a desire to change a participant-operation profile's parameters/attributes 302. The present invention then determines whether or not a user has permission to modify the participant-operation profile 304 by checking the user's participant-operation profile. If the user does not have permission, processing path 306 is taken. A notice to the user that permission has been denied 307 is indicated and the processing is taken to the return block 312. If it is determined that the user has permission to modify the participant-operation profile, processing path 306 is taken. The Policy Manager changes and modifies the participant-operation profile in accordance with user's command 310 and then the processing proceeds to return block 312.

The participant-operation profile also contains a policy list. Each policy in the policy list contains policy parameters which describe (1) who may change the participant-operation profile and (2) how control of the policy is passed from participant to participant. A controller is simply a conference participant who may modify values in the participant-operation profile. A sample policy list is shown in Table II.

Table II

POLICY LIST/*List of policies and associated information */ /*Each policy contains the following parameters*/

Policy /Name

Object/*object to which the policy applies, e.g., conference, participant, or application*/

Controller/*participant who may reset values in the participant-operation profile*/

Control retention/*rule for yielding control of the policy to another participant*/

Election/*rules describing who selects the new controller*/

Succession/*rules for selecting the new controller*/

The policy manager verifies that a controller may change the participant-operation profile in the following manner. First, a controller submits a command to change an attribute value in a participant-operation profile. Second, the policy manager examines the policy list to determine if the controller is permitted to change the attribute value in a participant-operation profile. If permission is verified, then the policy manager carries out the change by modifying the participant-operation profile. If no, it is determined that the controller is not permitted to change the value then the policy manager generates an error message to the controller, informing the controller that he/she is not allowed to make the change.

In another embodiment, the controller is presented with a GUI that only enables the controller to submit commands that are permitted by the policy. Whenever changes in a participant-operation profile are made, the GUI is dynamically modified to reflect the changes. For example, if Sam is the controller for the adjournment attribute, then Sam has a dialog that enables Sam to specify which participants may reset the adjournment time. If Sam is removed from this controller position, then the dialog is grayed out and may not be used by Sam.

Figure 11:
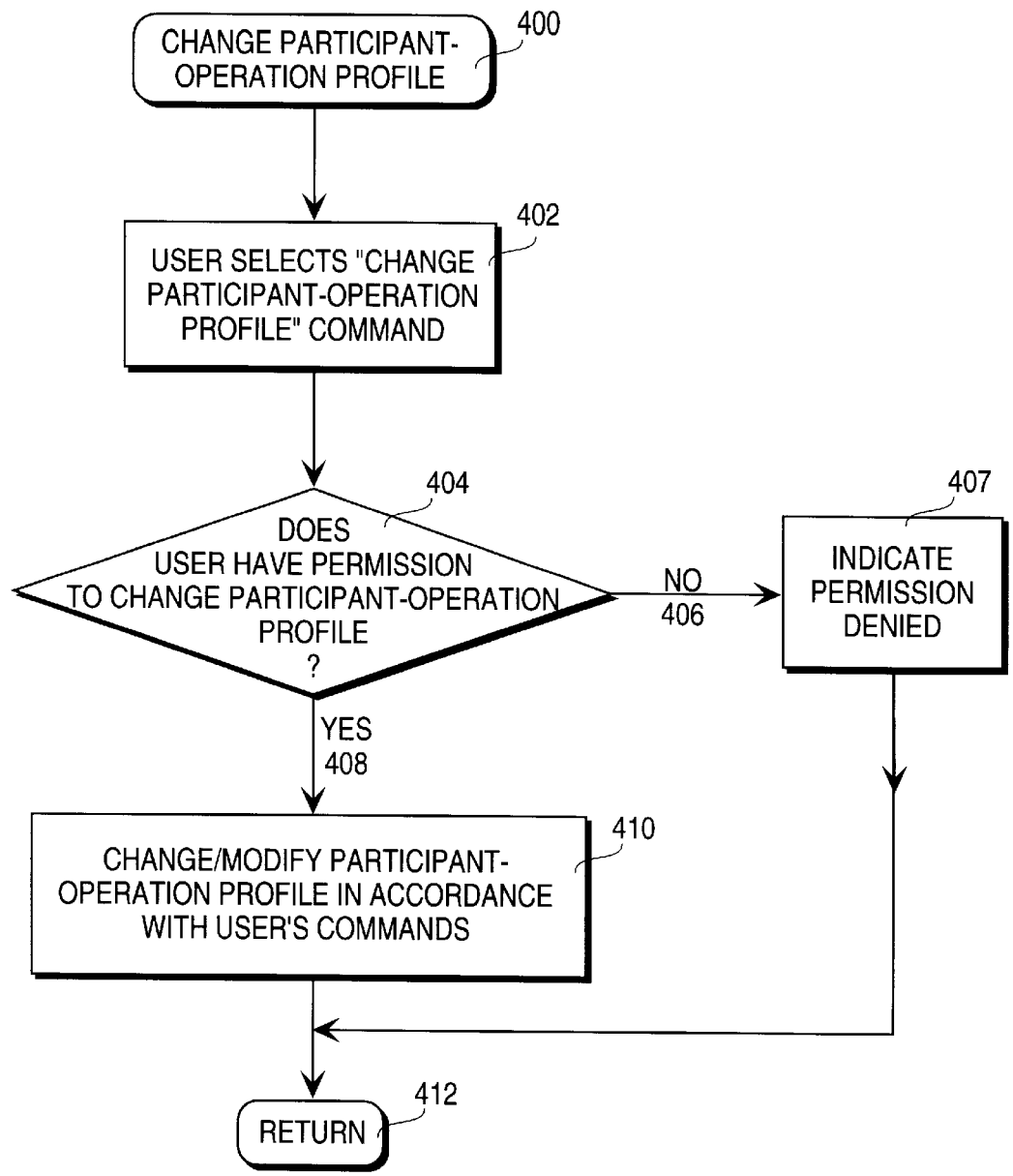
FIG. 11 illustrates the processing flow for changing a participant profile.

FIG. 11 illustrates the processing steps of the present invention allows to change a participant-operation profile 400. A user initially selects a "change policy list function" 402. Next, a determination is made of whether or not the user has permission to change a participant-operation profile 404. If the user is determined not to have permission, the processing path 406 is taken. A notice to the user indicating that the permission has been denied 407 is presented and then the processing proceeds to return block 412. If the user has permission to change a participant-operation profile, then processing path 408 is taken. The policy manager changes/modifies the participant-operation profile in accordance with the user's command 410. The process then proceeds to return block 412.

There are three ways to trigger a controller change. First, if a timer generates a time-out event, and a time limit control retention policy is in effect, then a controller change will occur. Second, if a single participant requests to become controller, and a grab control retention policy is in effect, then a controller change will occur. Third, if a sufficient percentage of the participants request that the controller be replaced, and a palace coup retention policy is in effect, then a controller change will occur.

There are three step for deciding who appoints a new controller. First if the above polices are not in effect, a software module, by default selects which participant becomes the next controller. Second, if the controller election policy is in effect, a succession policy (described below) will be used. Third, if all participant election policy is in effect, an election is held in which all participants vote to select the next controller. After the next controller is selected, the policy manager updates the controller field in the policy list with the identification (participant information) of the selected controller.

Figure 12:
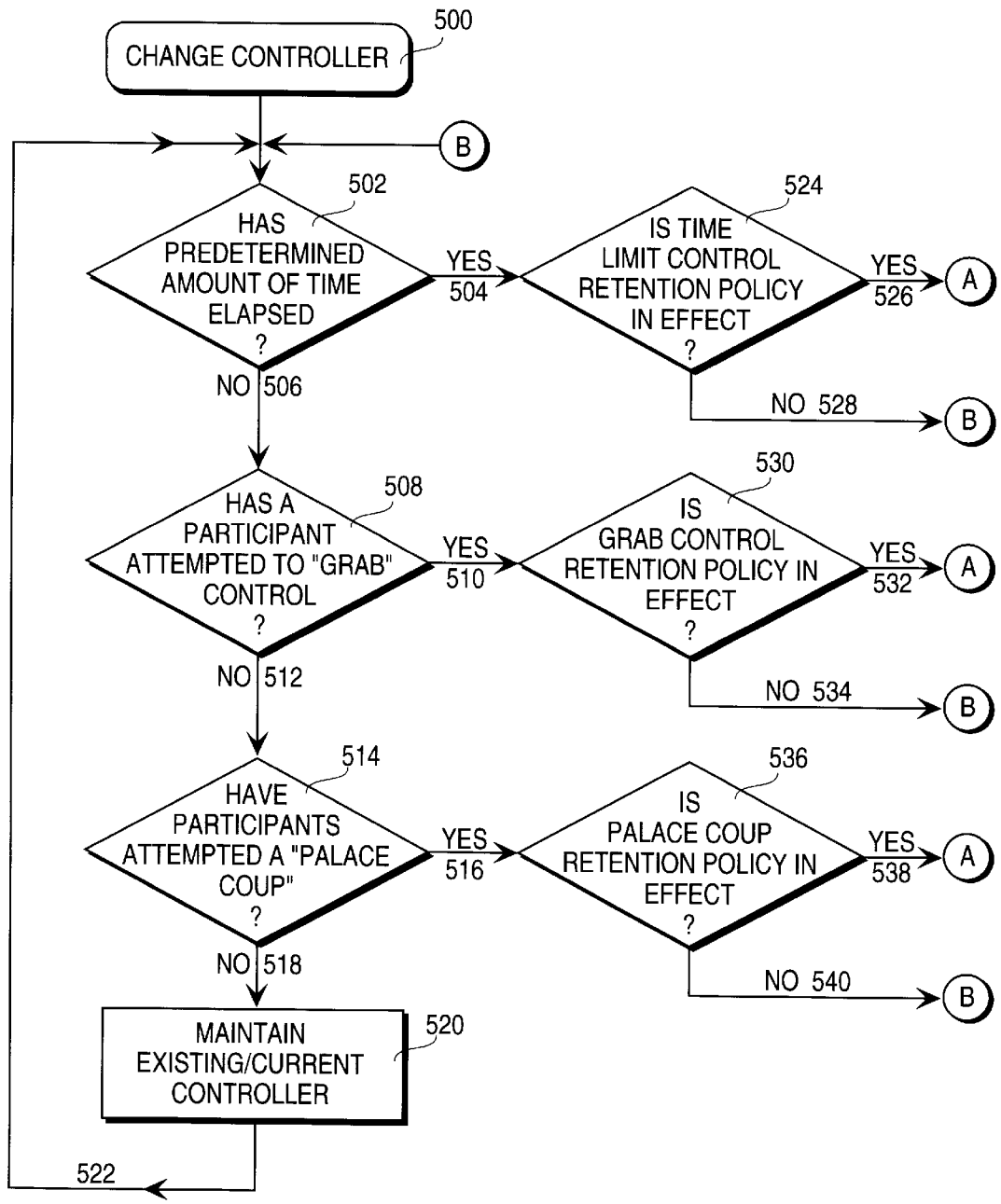
FIGS. 12 and 13 illustrate the processing flow for changing a controller.

FIG. 12 illustrates the processing steps of the present invention to change controllers 500. Processing flow begins with a determination of whether a predetermined amount of time has elapsed 502. If it is determined that a predetermined amount of time has not elapsed, processing path 506 is taken and a determination of whether a participant has attempted to grab control 506 is made. If it is determined that a participant has not attempted to grab control 508, processing path 512 is taken and a determination of whether participants have attempted a palace coup 514 is made. If it is determined that the participants have not attempted a palace coup, processing path 518 is taken and there is no change in the controller. In other words, the existing controller maintains control and processing path 522 loops to decision block 502 the beginning of the processing steps.

If the inquiry of decision box 502 is answered affirmatively (i.e., YES), processing path 504 is taken and a determination is made whether or not a "time-limit" control retention policy is in effect 524. If the result of decision box 524 is NO, then processing path 528 is taken, returning 25 the processing to node B, the beginning of the processing steps. If decision block 508 produces an affirmative result (i.e., a participant has attempted to grab control), then processing path 510 is taken and a determination is made whether or not a "grab" control retention policy is in effect 530. If the result of decision block 530 is NO, processing path 534 is taken, returning the processing to node B.

If the result of the inquiry of decision block 514 is YES (i.e., the participants have attempted a palace coup), then a determination is made whether or not a "palace coup" retention policy is in effect 536. If the result of decision block 536 is NO, the processing follows processing path 540 to node B.

If the result of processing block 524, 530, or 536 is YES, the processing paths 526, 532, and 538 would have been taken respectively to node A.

Figure 13:
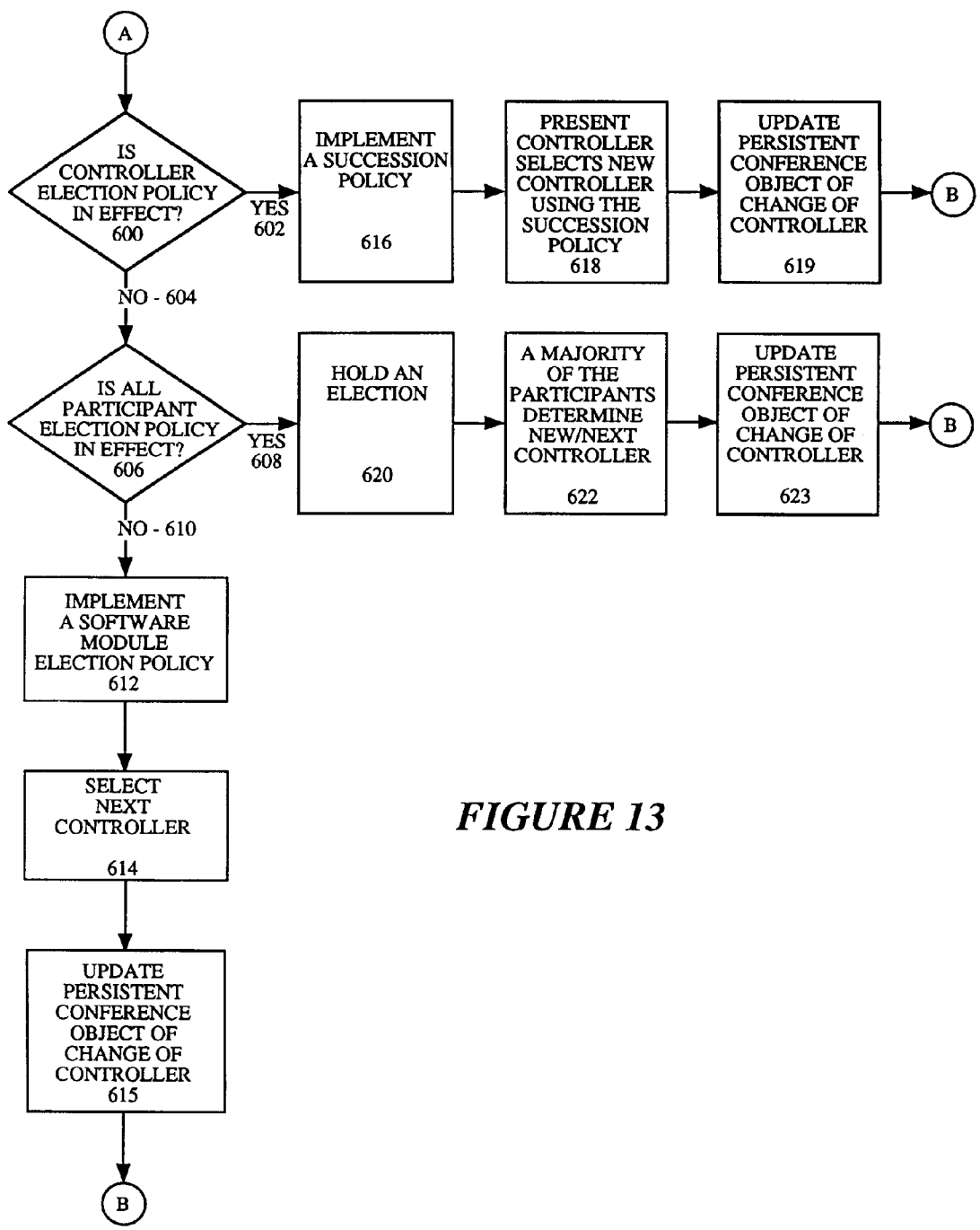

Referring now to FIG. 13, processing continues at node A. In decision block 600, a determination is made whether or not a controller election policy is in effect. If the result of decision block 600 is NO, processing path 604 is taken, and a determination is made whether or not the "all-participants" election policy is in effect 606. If the result of decision block 606 is NO, processing path 610 is taken and the policy manager implements a software module election policy 612. Thereafter, the policy manager selects the next/new controller 614. After a new controller is selected, the persistent conference object is updated of this change in controller 615 and processing returns to node B.

If the result of decision block 600 is YES, processing path 602 is taken and the processor implements a succession policy 616. The present invention, as embodied in a persistent conference manager, may maintain a queue onto which it adds participants. For example, under certain succession policies, a participant is added to the queue when the participant signals that he/she desires to become a controller of the conference.

Depending on upon succession policy is in effect, the persistent conference manager inserts participants onto the queue and selects a next/new controller in accordance with the succession policy. In an "anointing" policy, all active participants are placed on the queue. The current controller then selects a new controller from the participants on the queue. In a "hand-raising" policy, each participant who signals that they want to become a controller is placed onto the queue. The current controller then selects a new controller from those participants on the queue. In a "queuing" policy, the present invention places each participant who signals that they want to become a controller onto a queue. The persistent conference manager then selects the participant at the top of the queue to become the new controller. If a "round-robin" policy is in effect, the persistent conference manager places all active participants on a queue. The present invention then selects a participant at the top of the queue to be the next controller. In addition, the current controller is added/appended to the end of queue. Each of the participants then becomes a controller in a sequential fashion.

If a "seniority" policy is in effect, then the persistent conference manager places all the participants on the queue, according to a predetermined seniority scheme. This seniority scheme may be predetermined by those who are organizing a particular conference. The persistent conference manager then selects a participant at the top of the queue to be the next controller. If a random succession policy is in effect, the persistent conference manager places all the active participants on the queue. The persistent conference manager then selects one of the participants to become the next controller in a random, undeterministic fashion.

The present controller then selects a new controller using the succession policy 618. After a new controller is selected, the persistent conference object is updated 619 with the new controller information, the processing returns to node B.

If the result of decision block 606 is YES, processing path 608 is taken and the processor holds an election 620. A majority of the participants determine the new/next controller 622. After a new controller is chosen the persistent conference object is updated of this change of controller 623, and the processing returns to node B.

It is noted that although the present invention has been described in terms of the preferred and alternate embodiments, it will be appreciated that various modifications and alterations might be made thereto by those skilled in the art without departing from the spirit and scope of the invention. Therefore, the invention should be measured in terms of the claims which follow.

We claim:

1. A method of managing a plurality of conference parameters in a persistent conference object in a conference between participants comprising:
   (a) monitoring the conference parameters;
   (b) updating the conference parameters stored in the persistent conference object;
   (c) saving the conference parameters to the persistent conference object upon at least one first user-initiated command or at every predetermined time interval; and
   (d) automatically resuming the conference upon a second user-initiated command; wherein the conference parameters include a policy profile that governs operations of the conference without participants' manual intervention, said policy profile including a turn-taking protocol defining speaking rules to be followed by each participant.

2. The method of claim 1, wherein the persistent conference object includes application identifier information for identifying a particular application and application status information for indicating whether that application is active or inactive.

3. The method of claim 1, wherein the persistent conference object includes document identifier information for identifying a particular document and document status information for indicating whether that document is active or inactive.

4. The method of claim 1, wherein the persistent conference object includes information on at least one user policy.

5. The method of claim 1, wherein the step of saving conference parameters to a particular persistent conference object further includes the steps of:

prompting the user for an object name to be associated with the particular persistent conference object;

storing the conference parameters to the object identified by the user-selected file name.

6. The method of claim 1, wherein the step of monitoring the conference parameters further includes the steps of:

detecting when an application is opened and when an application is closed by a participant;

detecting when a document is opened and when a document is closed by a participant;

detecting when a new participant joins the conference and when a participant leaves a conference; and detecting a change in any one of a plurality of conference policies.

7. The method of claim 1, wherein the persistent conference object includes participant identification information for identifying current and new participants and participant status information for indicating whether or not a particular participant is currently active or is no longer a participant of the conference.

8. The method of claim 1, wherein the updating of the conference parameters stored in the persistent conference object is to memory, and wherein the saving of the conference parameters to the persistent conference object is onto a disk.

9. A method of automatically establishing a conference environment for participants comprising:

(a) opening a persistent conference object on disk;

(b) reading the persistent conference object for the conference parameters; and (c) implementing the conference parameters to establish the desired conference environment upon a user-initiated command;

wherein the conference parameters include a policy profile that governs operations of the conference without participants' manual intervention, said policy profile including a turn-taking protocol defining speaking rules to be followed by each participant.

10. The method of claim 9, wherein the step of implementing the conference parameters includes the steps of establishing a communication link between the participants.

11. The method of claim 9, wherein the step of implementing the conference parameters further includes the step of displaying a list of application programs that were either opened at the time the persistent conference object was saved or applications that were intended by the participants to be used during the conference.

12. The method of claim 9, wherein the step of implementing the conference parameters further comprises the step of displaying a list of documents that were opened at the time the persistent conference object was saved to disk or that were intended by the participants to be used during the conference, wherein the participants may open any of the documents on the list by selecting those documents desired.

13. The method of claim 9, wherein the step of implementing the conference parameters further includes the steps of:

opening the applications indicated in the persistent conference object; and opening the documents indicated in the persistent conference object.

14. The method of claim 9, wherein the persistent conference object includes document identifier information and document status information.

15. The method of claim 9, wherein the persistent conference object includes application identifier information and application status information.

16. The method of claim 9, wherein the persistent conference object includes participant identifier information and participant status information.

17. The method of claim 9, wherein the persistent conference object includes policy identifier information and policy status information.

18. A computer readable medium having embodied thereon a computer program, the computer program being executable by a machine, said computer program including:

(a) a code segment for monitoring a plurality of conference parameters in a persistent conference object in a conference between participants;

(b) a code segment for updating the conference parameters stored in the persistent conference object;

(c) a code segment for saving the conference parameters to the persistent conference object upon at least one first user-initiated command or at every predetermined time inverval; and (d) a code segment for automatically resuming the conference upon a second user-initiated command;

wherein the conference parameters include a policy profile that governs operations of the conference without participants' manual intervention, said policy profile including a turn-taking protocol defining speaking rules to be followed by each participant.

19. A computer readable medium having embodied thereon a computer program as claimed in claim 18, wherein the persistent conference object includes application identifier information for identifying a particular application and application status information for indicating whether that application is active or inactive.

20. A computer readable medium having embodied thereon a computer program as claimed in claim 18, wherein the persistent conference object includes document identifier information for identifying a particular document and document status information for indicating whether that document is active or inactive.

* * * * *

UNITED STATES PATENT AND TRADEMARK OFFICE
CERTIFICATE OF CORRECTION

PATENT NO. : 5,907,324
DATED : May 25, 1999
INVENTOR(S) : Larson et al.

It is certified that error appears in the above-identified patent and that said Letters Patent is hereby corrected as shown below:

Column 19,
Line 31, delete "25" at the end of the line.

Signed and Sealed this

Twenty-seventh Day of July, 2004

JON W. DUDAS
*Acting Director of the United States Patent and Trademark Office*